March 21, 1950 — L. E. VARDEN — 2,501,365
PHOTOGRAPHIC EXPOSURE TIMING
Filed April 27, 1946 — 2 Sheets-Sheet 1
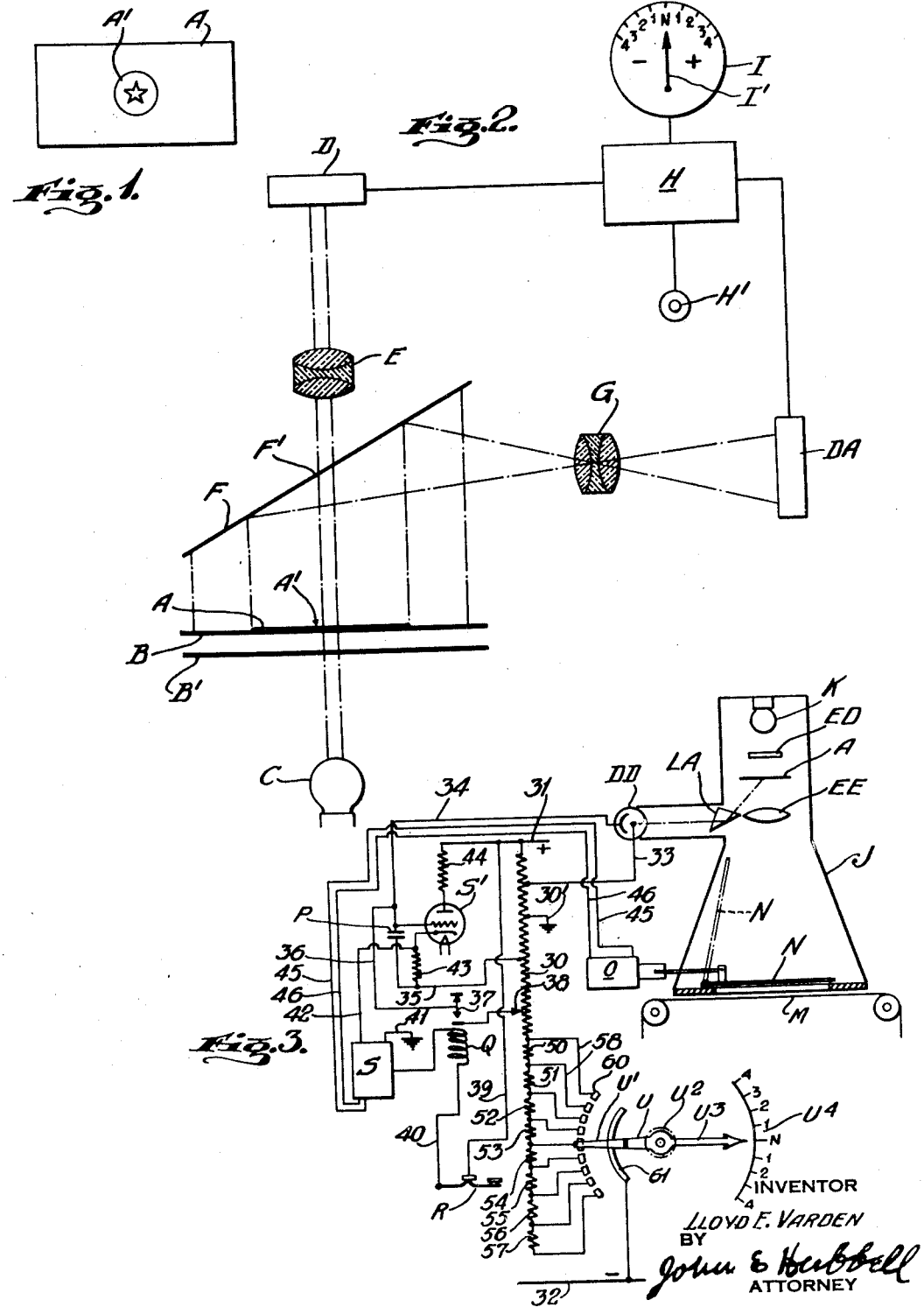
INVENTOR
LLOYD E. VARDEN
BY John E. Hubbell
ATTORNEY March 21, 1950 L. E. VARDEN 2,501,365
PHOTOGRAPHIC EXPOSURE TIMING
Filed April 27, 1946 2 Sheets-Sheet 2

INVENTOR
LLOYD E. VARDEN
BY
John E. Hubbell
ATTORNEY

Patented Mar. 21, 1950

2,501,365

UNITED STATES PATENT OFFICE 2,501,365

PHOTOGRAPHIC EXPOSURE TIMING

Lloyd E. Varden, New York, N. Y., assignor to Pavelle Color Incorporated, New York, N. Y., a corporation of Delaware Application April 27, 1946, Serial No. 665,506

7 Claims. (Cl. 88—24)

1

The present invention was devised and is adapted for use in the photographic reproduction of a picture on a transparency by projecting light through the transparency to light sensitive photographic material, and the general object of the present invention is to provide an improved method of, and improved apparatus for determining the optimum exposure period in the photographic reproduction of a picture in the manner described.

It has long been recognized that in producing a picture in the above described manner, the appropriate exposure period depends upon the intensity of the projected light and on the density or light transmitting capacity of the transparency. The light intensity factor and the density or light transmitting factor collectively determine the amount of light which passes through the transparency to the photographic material on which the picture is reproduced, and thus determine the aggregate exposure effect. Various arrangements have been devised in which a photocell is employed to make the exposure period automatically dependent on the intensity of the light projected through the transparency. In one such arrangement in practical use, the photocell is associated with a source of current, a condenser and an electronic amplifying and relay controlling mechanism for cooperation to make the exposure period dependent on the time required for the photocell current to effect a predetermined reduction in a charge of electricity previously accumulated by the condenser.

An automatic exposure control arrangement of the character just described ordinarily gives satisfactory operative results in reproducing a picture of a transparency when the latter includes no portion which is of especial interest and which varies appreciably in density from the average or integrated density of the transparency. It has long been recognized, however, that in reproducing a picture including a small portion containing an image, for example the image of a child's face, which is of especial interest to the person or persons for whom the picture is being made, that the exposure period should be that required for a satisfactory reproduction of the portion of special interest, even though it results in some under-exposure or over-exposure of other portions of the picture.

The importance of a suitable exposure of the special interest portion of the picture has led to the development of arrangements, in which only light passing through the special interest portion of the transparency is transmitted to a

2 photocell used to automatically determine the exposure period. In practice, it has been found, however, that where there is substantial contrast in density between the special interest portion of the transparency and the average or integrated density of the transparency, both of said densities should be taken into account in determining the exposure period.

A primary object of the present invention is to provide a simple and effective method of making the exposure period accurately dependent on the relation of the average or integrated density of the transparency to the density of the transparency portion which is of especial interest.

In a prior method which has been commercially used, an attempt is made to make the exposure period suitably dependent on the two densities last mentioned by manual adjustment of the above mentioned type of automatic exposure controlling arrangement which includes a photocell, condenser and electronic amplifying and controlling mechanism. However, in said prior method, the manual adjustment made was not based on accurate measurements of the two densities, or of their relative values, but was based on an estimate of the adjustment needed, the estimate being based on a visual inspection of the transparency by the estimator. The substitution of the accurate measurements made in accordance wtih the present invention, for the estimates made in the use of said prior method has decreased the number of improperly exposed pictures by more than fifty per cent in a projection printing plant in which substantial commercial use of the prior method and of the method disclosed herein have been made by the same skilled workers.

In a successful practical form of the present invention, I adjust an automatic exposure controlling arrangement of the above mentioned type in such manner as to vary the charge of electricity accumulated on the condenser preparatory to each exposure, in accordance with an accurate measurement of the ratio of the light transmitting capacity of the special interest portion of the transparency to the light transmitting capacity of other portions of the transparency.

A specific object of the present invention is to provide simple and effective apparatus for rapidly and accurately measuring the relative densities of the special interest portion and other portions of a transparency.

The various features of novelty which characterize my invention are pointed out with particularity in the claims annexed to and forming a part of this specification. For a better understanding of the invention, however, its advantages, and specific objects attained by its use, reference should be had to the accompanying drawings and descriptive matter in which I have illustrated and described preferred embodiments of the invention.

Of the drawings:

Fig. 1 is a diagrammatic representation of a transparent picture to be reproduced;

Fig. 2 is a diagrammatic representation of measuring apparatus for comparing the densities of different portions of a transparency;

Fig. 3 is a diagrammatic representation of a projection printer having exposure timing mechanism adapted for adjustment in accordance with the measurements made with the apparatus shown in Fig. 2;

The apparatus shown diagrammatically by way of example in Fig. 2, comprises a clear glass plate B forming a support on which a transparency A rests during the operation of comparing the light transmitting capacity of a portion A' of the transparency which is of special interest, with the integrated light transmitting capacity of the remainder of the transparency A. The item of especial interest in the portion A' of the transparency A is diagrammatically illustrated by way of example in Fig. 1, is a conventional star-shaped figure. Light emitted by a tungsten filament lamp or other suitable light source C at one side of the support B, passes through the support B and the transparency A resting thereon. A relatively small portion of the light thus passed through the transparency passes through the special interest portion A' of the transparency and thence to a photocell D through a focusing lens E. The light transmitted through the transparency A, is transmitted through the portion of the transparency picture A separate from the portion A', and is reflected by an inclined reflecting mirror F to a second photocell DA, on which the reflected light is focused by a lens G interposed between the photocell DA and the mirror F.

In the arrangement shown, the mirror F is formed with a central aperture F' in register with the special interest portion A' of the transparency and through which the light passing through the portion A' passes to the lens E and photocell D. To facilitate the proper location of the special interest portion A' of the transparency on the support B, the latter may have lines marked on it to identify the portion thereof in register with the aperture F' and lens E. As shown, a translucent screen B', which may be an opal glass plate, is interposed between the lamp C and transparency A.

The ratio of the amounts of light respectively transmitted to the photocells D and DA depends upon the relative densities of the special interest portion A' of the transparency A and of the remaining portion of the transparency and depends also on the relative areas of said portions. That ratio may be accurately measured by apparatus which may take various forms, one of which is diagrammatically illustrated in Figs. 2 and 4. The measuring apparatus shown in those figures comprises an electronic measuring and amplifying system H in which the photocells D and DA and a deflecting meter I are connected. The meter I may be a milliammeter. Advantageously and as diagrammatically illustrated, the meter I deflects in one direction or the other from a neutral position, accordingly as the ratio of the amounts of light respectively received by the photocells D and DA exceeds or falls below a predetermined ratio determined by the calibration adjustment of the electronic system H, the extent of the deflection in each direction being proportional to the extent of departure of the actual light ratio from the predetermined normal ratio.

Figure 4:
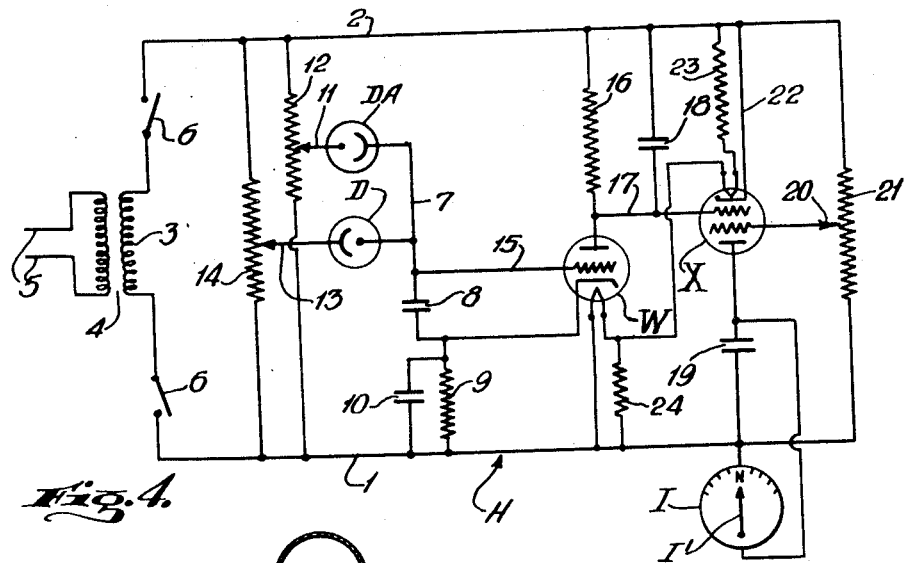
Fig. 4 is a diagram showing the electronic measuring circuit with which the photoelectric cells shown in Fig. 2 are associated.

The circuit network of the measuring and amplifying system H, shown diagrammatically in Fig. 4, is of a known type for measuring the ratio of the light intensities transmitted to the cathodes of photocells connected in the network as are the photocells D and DA. Said network comprises conductors 1 and 2 between which the secondary winding 3 of a transformer 4 is connected. The primary winding of the transformer 4 is connected to alternating current supply conductors 5 which may be connected to any available source of alternating current of ordinary voltage and frequency, such as a 115 volt, 60 cycle source. As shown, the terminals of the secondary winding 3 are connected to and disconnected from the conductors 1 and 2 by means of switch blades 6 which may form a part of a single, double pole switch. The pivoted blade type of switch shown in Fig. 4 is shown in Fig. 2 as a push button switch H'. The photoelectric cell DA has its cathode connected by a conductor 7 to one terminal of a condenser 8 which has its other terminal connected to the conductor 1 by a resistance 9, and by a condenser 10 in parallel with that resistance. The anode of the photocell DA is connected through a slider contact 11 to a calibrating resistance 12 which is connected between the conductors 1 and 2, and along which the contact 11 may be manually adjusted. The photoelectric cell D has its anode connected to the conductor 7, and has its cathode connected through a slider contact 13 to a calibrating resistance which is connected between the conductors 1 and 2, and along which the contact 13 may be adjusted.

The conductor 7 is connected by the conductor 15 to the control grid of a triode W. The latter may be a 6F5–GT commercial type tube. The triode W has its cathode connected to the conductor 1 by the resistance 9 and the condenser 10 in parallel therewith, and the anode of the triode W is connected to the conductor 2 by a resistance 16. The anode of the triode W is also connected by a conductor 17 to the control grid of a tetrode X, which may be a 25L6–GT commercial type tube.

The tetrode X has its anode connected to the conductor 1 through the meter I and a condenser 19 in parallel with the meter. The meter I is a direct current milliammeter which for its ordinary intended use may have its operating circuit arranged and calibrated to measure currents varying from zero to .25 milliampere or so. The screen grid of the tetrode X is connected through a slider contact 20 to a resistance 21 connected between the conductors 1 and 2 and along which the slider contact 20 may be adjusted. The cathode of the tetrode X is connected to the conductor 2 by a conductor 22. The electrode valves W and X have cathode heating filaments shown as connected in series with one another and with a resistance 23 in a circuit branch connected between the conductors 1 and 2. The portion of said branch including the filament of the triode W and its connection to the conductor 1 is shunted by a resistance 24.

While the values of the resistance and condenser elements of the circuit shown in Fig. 4 may be varied, it is noted by way of illustration and example that in an embodiment of the invention in successful commercial use, the capacity values of the condensers 8, 10, 18 and 20 are 0.001, 0.5, 0.1 and 2 microfarads, respectively, and that the resistances 12 and 14 are each of 30,000 ohms. The resistance 9 is .5 megohm, the resistance 16 is 0.25 megohm, the resistance 21 is 20,000 ohms, the resistance 23 is 280 ohms, and the resistance 24 is 50 ohms.

In calibrating the apparatus shown in Fig. 4, it is ordinarily advantageous to adjust the slider contact 11 along the resistance 12 so that with the related adjustments of the contacts 13 and 20 hereinafter described, good, substantially full-scale performance is obtainable under the prevailing operating conditions. In general, the optimum adjustment of the contact 11 depends upon the intensity of the light emitted by the lamp C.

When that lamp gives light of relatively high intensity, the potential impressed on the photocell DA may well be lower than when the lamp C gives light of lower intensity. The adjustment of the contact 20 along the resistance 21 directly determines the scale deflection of the pointer I' of meter I in response to a given variation in the ratio of the intensities of illumination of the two photocells. Normally, the adjustment of the contact 20 should be such that the maximum variation in said light intensity ratio which is to be expected, will result in the deflection of the meter pointer I' from one end or the other of the meter scale.

The adjustment of the contact 11 along the resistance 12 is preferably so related to the adjustment of the contact 13 along the resistance 14, that when the intensity of the special interest portion A' of the transparency A is equal to the average density of the remainder of the transparency, the deflecting pointer I' of the meter I will occupy its neutral position. Regardless of the relative densities of the portion A' and remaining portion of the transparency A, the small area of the portion A' relative to the area of the remainder of the transparency ordinarily results in a more intense illumination of the photocell DA than of the photocell D.

It is believed that the operation of the apparatus shown in Figs. 2 and 4 may be correctly explained as follows:

When the intensities of illumination of the photocells D and DA are such that with the existing calibration of the apparatus equal electric currents pass in opposite directions through the photocells during the successive alternating current half-cycles during which the respective photocells are conductive, the condenser 8 will be given opposing charges of equal magnitude by the currents flowing through the two photocells. In consequence, the D. C. potential impressed by the conductor 15 on the control grid of the valve W will then be that of the alternating current conductor 1. When a transparency A is put in the apparatus as shown in Fig. 2 and the energizing switch of the amplifying and control system H is closed, the more intense illumination of the photo tube DA will cause the current flowing through the tube DA to be of greater magnitude than the current flowing through the less intensely illuminated photocell D. In consequence, the condenser 8 will then receive charges from the tube DA greater than the opposing charges received from the tube D, and a D. C. voltage across the condenser 8 will then build up. The polarity of that charge is such as to increase the cathode potential of the photocell DA and to decrease the cathode potential of the photocell D during the half-cycles in which the respective photocells become conductive. Those cathode potential changes shorten the periods during which the photocell DA is conductive, and lengthen the alternating periods during which the photocell D is conductive.

Under the assumed conditions the apparatus quickly stabilizes with the D. C. voltage across the condenser 8 such that the opposing charging effects on the condenser 8 of the two photocells are equal, the relative shortness of the periods during which current is passing through the photocell DA to the condenser, being compensated for by the fact that the charging current through the photocell DA is greater than the charging current through the tube D.

The output currents of the amplifier valves W and X increase and decrease as the value of the D. C. potential of the condenser 8 is increased and decreased. In consequence, the plate current of the tube X which flows through the meter I increases and decreases as the ratio of the intensities of illumination of the photocells DA and D respectively increase and decrease. With the apparatus calibrated as above described, the pointer I' of the meter I will deflect away from its neutral or intermediate position in one direction or in the other direction, as the actual ratio of the intensities of illumination of the photocells DA and D rises above and falls below the ratio at which the meter pointer occupies its neutral position.

In Fig. 3, I have diagrammatically illustrated an automatic exposure control system in association with a projection printer J, and including means comprising a manually adjustable rheostat for adjusting the control system in accordance with measurements which may be made with the apparatus shown in Figs. 2 and 3. The projection printer J comprises a lamp K from which light rays are transmitted through a condensing lens ED, a transparency A, and a main lens E to a photographic film M when the shutter N is turned from its closed position, shown in full lines, into its open position shown in dotted lines. The shutter N is biased to its closed position and is moved to its open position by the energization of an electromagnetic relay O. Some of the light passing from the lamp K through the transparency A passes to a prism LA located at one side of the lens EE, and an image of the picture on the transparency A is reflected by the prism LA to a photocell DD.

The photocell DD is energized by direct current supplied through a potentiometer resistance or voltage divider 30. The latter is connected between the positive and negative direct current supply conductors 31 and 32. The voltage divider 30 is shown as connected to ground by a conductor 30' at a point intermediate its ends. The anode of the photocell DD is connected by a conductor 33 to the voltage divider 30 at the positive side of the ground connection 30'. The cathode of the photocell DD is connected by a conductor 34 to one terminal of a condenser P. The second terminal of the condenser P is connected by a conductor 35 to the voltage divider 30 at a point on the negative side of the ground connection 30'. The conductor 34 is connected by a conductor 36 to the movable contact 37 of a relay Q. The latter comprises a stationary contact connected to the voltage divider 30 through a slider contact 37 which is adjustable along the length of a portion of the voltage divider at the negative side of the point to which the condenser terminal 35 is connected. The contact 37 is biased to its upper open circuit position shown in Fig. 3, but is moved into its lower position in which it connects conductors 36 and 38 by the energization of the relay Q.

In the normal operation of the apparatus shown in Fig. 3, the relay Q is energized during the periods in which the relay O is deenergized and the shutter N is closed. In this condition of the apparatus, the condenser P accumulates and holds a charge of electricity as a result of the difference between the potentials of the points of the voltage divider 30 to which the conductors 35 and 38 are respectively connected. An exposure period is initiated by depressing the key switch R and thereby breaking the energizing circuit of the relay Q. That circuit includes the conductor 39 extending from one contact of the switch R to the supply conductor 31, a conductor 40 extending from the other contact of the switch R to one terminal of the energizing winding of the relay Q, the conductor connecting the second terminal of the relay winding to the output terminal of an electronically controlled relay S. The second output terminal of the relay S is formed by the ground connection 41, and the latter also connects one input terminal of the relay to the ground. The second input terminal of the relay S is connected by the conductor 42 to the cathode of a triode S' which has its control grid connected to the conductor 34. The cathode of the triode S' is connected to the conductor 35 through a resistance 43, and the anode of the triode S' is connected to the positive supply conductor 31 by a resistance 44.

When the opening of the switch R deenergizes the winding of relay Q, the relay device S operates to energize the shutter actuating relay O which has its terminals 45 and 46 connected to the relay S. The deenergization of the relay winding Q opens the previously closed condenser charging circuit. That circuit includes conductor 35, conductor 36, relay contact 37, slider contact 38 and the portion of the voltage divider 30 connecting the contact 38 to the conductor 35. Energization of the relay O opens the shutter N and initiates an exposure and the light then received by the photocell DD, makes the latter conductive, and condenser discharging current begins to flow through the circuit including conductor 33, the anode and cathode of the photocell, the conductor 34, condenser P, the conductor 35 and the portion of the voltage divider resistance 30 connecting conductors 33 and 35. The exposure period continues until the reduction in the charge on the condenser P increases the potential of the control grid of the triode S' relative to the triode cathode sufficiently to make the triode conductive. As will be apparent, the charge on the condenser P is of such polarity as to make the control grid potential negative relative to the potential of the end of the bias resistance 43 remote from the cathode of triode S'. As soon as the triode S' becomes conductive, the current flowing through its plate circuit between the ground connections 30' and 41, actuates the relay mechanism S to re-energize the relay Q and to deenergize the shutter actuating relay O. This terminates the exposure period.

Further reference to the relay mechanism S or its details seems unnecessary herein as that relay is not claimed as novel herein, but is of a known type now in public use, and is fully disclosed, moreover, in the application of Jacob Rabinowitz, Serial No. 594,403, filed May 18, 1945, now Patent No. 2,469,076, issued May 3, 1949. The magnitude of charge accumulated by the condenser P when its charging circuit is closed and thereby the length of the period during which the photographic material M is exposed to light transmitted through the transparency A, may be increased and decreased by decreasing the amount of resistance included in the portion of the voltage divider between the point at which the divider is connected to the conductor 38 and the negative supply conductor 32. That portion of the voltage divider 30, as shown, comprises eight series connected resistance sections 50–57 inclusive. Each of said sections has each of its two terminals connected by a corresponding conductor 58 to a corresponding rheostat contact stud 60. The nine studs 60 are arranged at intervals along a circular arc about the axis of oscillation of a rheostat arm U. The latter carries a bridging contact U' which normally connects one or another of the contacts 60 to an elongated contact 61 which is directly connected to the negative supply conductor 32. The rheostat arm U may be manually rotated through a knob U² and carries an index U³ movable along a scale U⁴ graduated as is the scale of the meter I.

When the rheostat index U³ occupies its intermediate or neutral position, the resistance sections 50, 51, 52 and 53 are operatively connected in the voltage divider circuit between the supply conductors 31 and 32, and the resistance sections 54, 55, 56 and 57 are operatively disconnected from said circuit. As the index U³ is turned clockwise from its neutral position first through one and then through another of its adjustment positions 1, 2, 3 and 4 at the corresponding side of its neutral position, the resistance sections 53, 52, 51 and 50 are successively cut out of the voltage divider in the order stated. When thereafter the rheostat arm U is returned to its neutral position, the resistance sections 50, 51, 52 and 53 are successively reconnected in the voltage divider circuit. As the rheostat arm is turned counter-clockwise from its neutral position through its corresponding positions 1, 2, 3 and 4, the resistance sections 54, 55, 56 and 57 are successively connected into the voltage divider circuit and are operatively disconnected from the circuit in the reverse order as the rheostat arm is returned to its neutral position.

In the contemplated use of the apparatus shown in Fig. 3 and the apparatus shown in Fig. 2 in accordance with my improved method, a transparency A from which a picture is to be reproduced in the printer J, is subjected to the measuring action of the apparatus shown in Fig. 2 before being subjected to the printing operation of the printer J. The measuring operation to which the transparency A is subjected in the apparatus shown in Fig. 2 results in a deflection of the pointer I' of the meter I which is an accurate measure of the relative light transmitting capacities of the portion A and of the remaining portion of the transparency A. Following the measuring operation and preparatory to the printing operation, the rheostat arm U carrying the contact U' is angularly adjusted in a direction and to the angular extent which is shown to be appropriate by the deflection of the pointer of the meter I obtained in the previous ratio measurement of the transparency.

When so adjusted the printer J is in condition for a printing operation with a proper exposure period as soon as the starting switch R is opened.

When the starting switch R is momentarily opened, the relay S energizes the relay O which then opens the shutter N and thus initiates the exposure period. The opening of the switch R also deenergizes the winding of the relay Q, whereupon the contact 37 moves upward to open the previously closed charging circuit for the condenser P. When the condenser charging circuit and the shutter N are thus opened the photocell DD becomes conductive and the current flowing through the photocell gradually reduces the charge given the condenser P by the charging circuit opened by the up movement of the contact 37. As soon as the reduction of the condenser charge makes the potential of the control grid of the triode S' sufficiently less negative with respect to the cathode of the triode, the latter becomes conductive. The resultant plate current flow through the triode S' actuates the relay S to deenergize the relay O whereupon the shutter N closes and thus terminates the exposure period. When the relay S is actuated to deenergize the relay O it also re-energizes the winding of the relay Q. Thereupon the contact 37 is depressed to re-establish the condenser charging circuit.

The duration of the exposure charge terminated in the manner just described, depends upon two factors, namely: the magnitude of the charge accumulated by the condenser P when the condenser charging circuit is closed, and the magnitude of the photo tube current by which the condenser is discharged when the condenser charging circuit is opened. In the particular form of the invention illustrated by the drawings, the adjustment of the rheostat arm U varies the potentials at the point along the voltage divider resistance 30 at which the conductor 35 is connected to the resistance, and at the point at which the slider contact 38 engages said resistance. In consequence, the adjustment condition of the rheostat arm U controls the charge acquired by the condenser P preparatory to each exposure period, and is one of two conditions which control the rate at which the condenser charge is varied during the exposure period. The other and more important condition controlling the magnitude of the condenser discharging current is the light transmission through the transparency A to the photocell DD. In using the apparatus shown in Fig. 3 in the practice of the novel method disclosed herein, the adjustment given the rheostat arm U is made in conformity with the deflection of the meter pointer I', and is thus dependent upon the relative light transmitting capacities of the special interest portion A' of the transparency A and of the remaining portion of the transparency, since those capacities respectively determine the magnitudes of the current flowing through the photocells D and DA.

Thus, as will be apparent, the conjoint use of the apparatus shown in Figs. 2 and 3 in accordance with the method disclosed herein, makes the exposure period dependent both on the light transmitting capacity of the small special interest portion A' of the transparency, and upon the light transmitting capacity of the remaining portion of the transparency.

At this point it may be explained that the area of the portion A' is ordinarily so small in comparison with the total area of the transparency A that the light passing to the photocell DA in Fig. 2 may be treated as substantially equal to the integrated light transmitting capacity of the entire transparency. There is thus no substantial difference in general overall operation result between the apparatus shown in Fig. 2, and the hereinafter described apparatus shown in Fig. 5. In the Fig. 5 apparatus, the light transmitted through all portions of the transparency A is passed to the photocell DC. The latter cooperates with the cell DA as does the cell D of Fig. 2.

The practical results obtainable by the use of my improved method are found to be substantially better than are obtainable with any prior method of coding or classifying transparencies for the purpose of giving proper effect to the differences in densities of a special interest portion of a transparency and of the remaining portion of the transparency, or of the entire transparency. The light ratio measurements made with the apparatus disclosed herein, avoid human element causes of error, such as faulty vision, faulty judgment and fatigue, which are inevitable in estimating density ratios as a result of a visual examination of the transparency.

For the general purposes of the present invention, it is immaterial how the scale of the meter I is graduated. It is not necessary that the user should know the numerical values of the light ratios existing when the meter pointer occupies any particular deflective position at either side of its neutral position. It is practically desirable, however, that the different scale positions of the meter I should be suitably related to different positions of the rheostat contact U' so that the light ratio corresponding to a given deflection of the meter pointer from its neutral position may be properly compensated for by the adjustment of the contact U' from its neutral position into a position corresponding to said deflection position of the meter pointer. It is obviously convenient to have the range of adjustment of the contact U' divided into steps respectively corresponding to the steps through which the meter pointer is adjusted, and to have the different resistance sections 50–57 so proportioned that when the meter pointer deflects into a particular position, the adjustment of the contact U' into a corresponding position will insure the proper exposure period. The number of adjustment steps through which the contact U' and the meter pointer are adjusted may vary with conditions. The number shown in Fig. 3 is ample for ordinary conditions of use.

Figure 5:
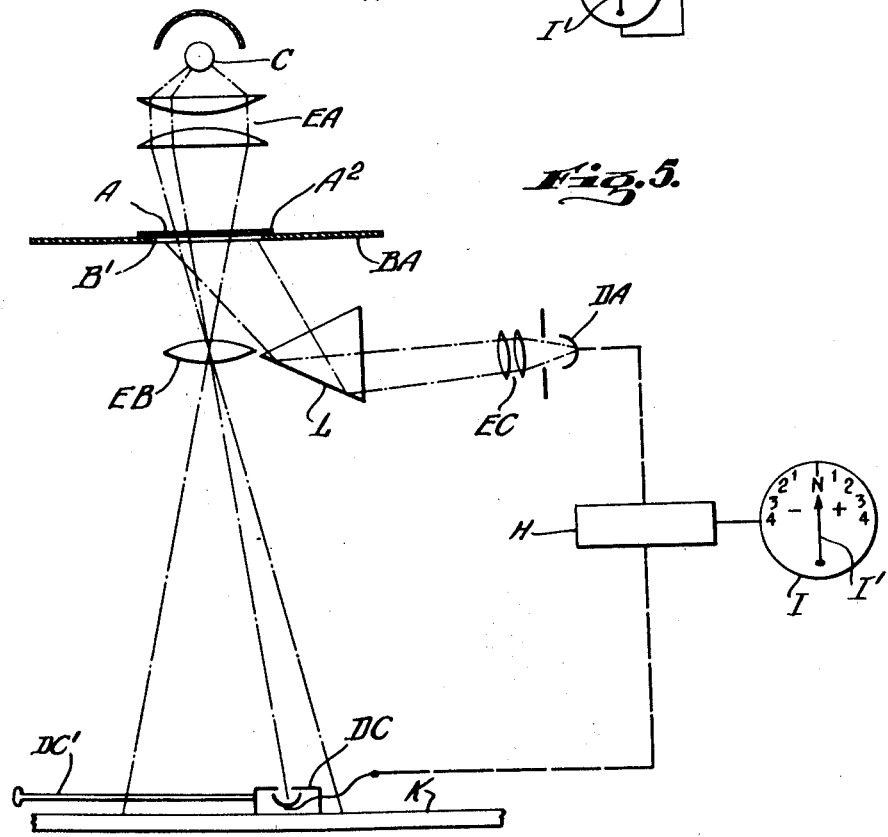
Fig. 5 is a diagrammatic representation of a modification of the apparatus shown in Fig. 2.

In the modified form of apparatus shown in Fig. 5, the transparency A is shown as mounted in a frame A² which rests on an opaque plate BA formed with an aperture B' through which the image of the entire picture of the transparency is projected by light passing from the lamp C through a condensing lens EA to the transparency. The image transmitted through the aperture B' is focused by a lens EB on a light receiving table or wall K which is transverse to the common axis of the lens EA and lens EB. The table or wall K forms a supporting platform, preferably horizontal, on which a photocell DC rests and over which the photocell may be adjusted by a handle DC' manipulated by the operator of the apparatus. The purpose of such manipulation of the photocell DC is to position the latter so that it will be in the direct path of the projected image of the special interest portion of the transparency. As the operator can see the enlarged and highly illuminated image of the complete picture on the transparency A, he has no difficulty in determining exactly where to locate the photocell DC so that it will provide a means for measuring the light transmitting capacity of the special interest portion of the transparency.

In Fig. 5, an image of the entire picture on the transparency A is projected to a reflecting prism L from which the image is reflected through focusing lenses EC to a photocell DA which serves the general purpose of and may be identical in construction with the photocell DA of Fig. 2. The photocells DA and DC may be connected to a measuring and amplifying circuit H and meter I exactly like the circuit H and meter I of Figs. 2 and 4.

The same general results are obtainable with the apparatus shown in Fig. 5, as with the apparatus shown in Fig. 2. As is apparent, in Fig. 5, the light transmitting capacity of the special interest portion A' of the transparency is compared with the average or integrated light transmitting capacity of the entire transparency instead of said transparency minus its portion A'. As has been explained, the portion A' is too small to make this difference between Figs. 2 and 5 significant in the ordinary use of the invention.

The apparatus shown in Fig. 5 has the special advantage that with it the user is able to determine by visual inspection of the highly illuminated image on the table K exactly where the image portion of special interest is located. When the transparency portion of special interest is of greater or less areal extent than the effective light receiving surface of the photocell DC, the position of the latter may be adjusted to compensate for the fact that the photocell cannot be directly responsive to light transmitting capacity of the entire special interest image portion, and of no other portion of the transparency. In some cases, also, the observer may find an inspection of the highly illuminated image on the table K of Fig. 5, that the transparency includes more than one special interest portion which should be taken into account in determining the exposure period. In such case, the user can readily make compensating adjustments as, for example, by averaging a meter reading obtained with the photocell DC in position to receive the image of one special interest portion of the transparency, with a second meter reading obtained with the photocell DC in position to receive the projected image of a second special interest portion of the transparency.

With the apparatus shown in Figs. 2 and 5, the light ratio is determined directly by a single comparative measurement, instead of by comparing the results of separate measurements of the two light intensities. There is a substantial advantage in the single comparative measurement as a result of the relatively minute amount of light transmitted to the phototubes D of Fig. 2 and DC of Fig. 5. The direct measurement of that relatively minute amount of light involves a probable error factor greater than is involved in comparing said minute quantity of light with another small quantity of light. This is particularly true when the result of the single comparative measurement can be directly utilized for the control purpose of the measurement. It is to be noted moreover that with the comparative measuring apparatus shown in Fig. 4, a substantial variation in the amount of light furnished by the measuring apparatus lamp C has no significant effect on the accuracy of the ratio measurements made.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. In the photographic reproduction of a picture on a transparency by projecting light through the transparency to light sensitive photographic material, the method which consists in passing light through a relatively small, special interest portion of the transparency in amount inversely proportional to the optical density of said portion, creating a first electric current proportional to said amount of light, passing light through all or a major portion of the transparency in amount inversely proportional to the average optical density of the portion of the transparency through which the last mentioned light is passed, creating a second electric current proportional to said second mentioned amount of light, measuring the ratio of the first current to the second current and projecting light through the transparency to said photographic material during an exposure period which is primarily dependent upon the rate at which light is transmitted through said transparency to said photographic material and which is decreased and increased in accordance with increases and decreases, respectively, in said ratio.

2. In the photographic reproduction of a picture on a transparency by projecting light through the transparency to light sensitive photographic material, the method which consists in projecting light through a relatively small, special interest portion of the transparency to a photocell, creating a first photocell current which is a measure of the amount of light projected through said transparency portion, passing light through all or a major portion of the transparency to a second photocell, creating a second photocell current constituting a measure of the amount of light passing through the transparency to said second photocell, measuring the ratio of said currents, projecting light through the transparency to said photographic material during an exposure period, and regulating said exposure period in predetermined accordance with the amount of light transmitted through the transparency during the exposure period and in predetermined accordance with the ratio of said currents.

3. In the photographic reproduction of a picture on a transparency by projecting light through the transparency to light sensitive photographic material, the method which consists in projecting light through a relatively small, special interest portion of the transparency to a photocell and thereby creating a first photocell current which is a measure of the amount of light projected through said transparency portion, passing light through all or a major portion of the transparency to a second photocell and thereby creating a second photocell current constituting a measure of the amount of light passing through the transparency to said second photocell, measuring the ratio of said first current to said second current, and in projecting light through the transparency to said photographic material during a regulable exposure period, varying said exposure period in accordance with variations in the rate at which light is transmitted through said transparency to said photographic material and decreasing and increasing said exposure period in accordance with increases and decreases, respectively, in said ratio.

4. Apparatus for comparing the light transmitting capacity of a small, special interest portion of a transparency of non-uniform density with the light transmitting capacity of at least the major portion of the transparency, comprising in combination a source of light, a support for the transparency, a photocell in position to receive light passing from said source through a small special interest portion of the transparency, a second photoelectric cell in position to receive light passing from said source through at least the major portion of said transparency, an electric meter and a light intensity ratio measuring circuit network including means for the connection of the network to a source of energizing current and in which said photocells and meter are connected so that said meter will deflect in accordance with variations in the ratio of the amounts of light transmitted to the two photocells.

5. Apparatus as specified in claim 4, in which said support is arranged for the adjustment of the transparency which it supports in accordance with the location in the transparency of the special interest portion thereof.

6. Apparatus for comparing the light transmitting capacity of a small, special interest portion of a transparency of non-uniform density with the light transmitting capacity of the major portion of the transparency, comprising in combination a source of light, a support for the transparency, a photocell in position to receive light passing from said source through a small, special interest portion of the transparency, a second photocell, a reflector inclined to the plane of the transparency and formed with an aperture for the passage of light from the source to the first mentioned cell and arranged to deflect to said second photocell light passing from said source through portions of the transparency other than said special interest portion, and a light intensity ratio measuring circuit network including means for the connection of the network to a source of energizing current and in which said photocells and meters are connected so that said meter will deflect in accordance with variations in the ratio of amounts of light transmitted to the two photocells.

7. Apparatus for comparing the light transmitting capacity of a small, special interest portion of a transparency bearing a picture, with the integrated light transmitting capacity of the transparency, comprising in combination a support for the transparency, a source of light arranged to pass light through the transparency when mounted on said support, structure providing a surface on to which light passing from said source through said transparency projects an image of said picture, a photocell having a light receiving surface substantially smaller than said image and mounted on said structure for movement into different positions in each of which said photocell receives an image of a different small portion of said picture, a second photocell having a light receiving surface in a position laterally displaced from the path of light rays passing from said source through said transparency, means for reflecting light passing from said source through said transparency to said second photocell to form an image of said picture on the light receiving surface of the latter, and an electric current ratio meter connected to said photocells and operative to measure the ratio of the photocell currents created by the images received by said photocells.

LLOYD E. VARDEN.

REFERENCES CITED

The following references are of record in the file of this patent:

UNITED STATES PATENTS

| Number | Name | Date |
|--------|------|------|
| 2,090,825 | Anthony | Aug. 24, 1937 |
| 2,235,590 | Rockwell | Mar. 18, 1941 |
| 2,406,716 | Sweet | Aug. 27, 1946 |
| 2,444,675 | Rath | July 6, 1948 |

OTHER REFERENCES

"Light-Scattering and Graininess," by Goetz et al., Journal of the Society of Motion Picture Engineers, December 1942, pages 375–383.